No. 727,519. PATENTED MAY 5, 1903.
G. W. WHITEHURST.
CULTIVATOR.
APPLICATION FILED JAN. 9, 1903.
NO MODEL.
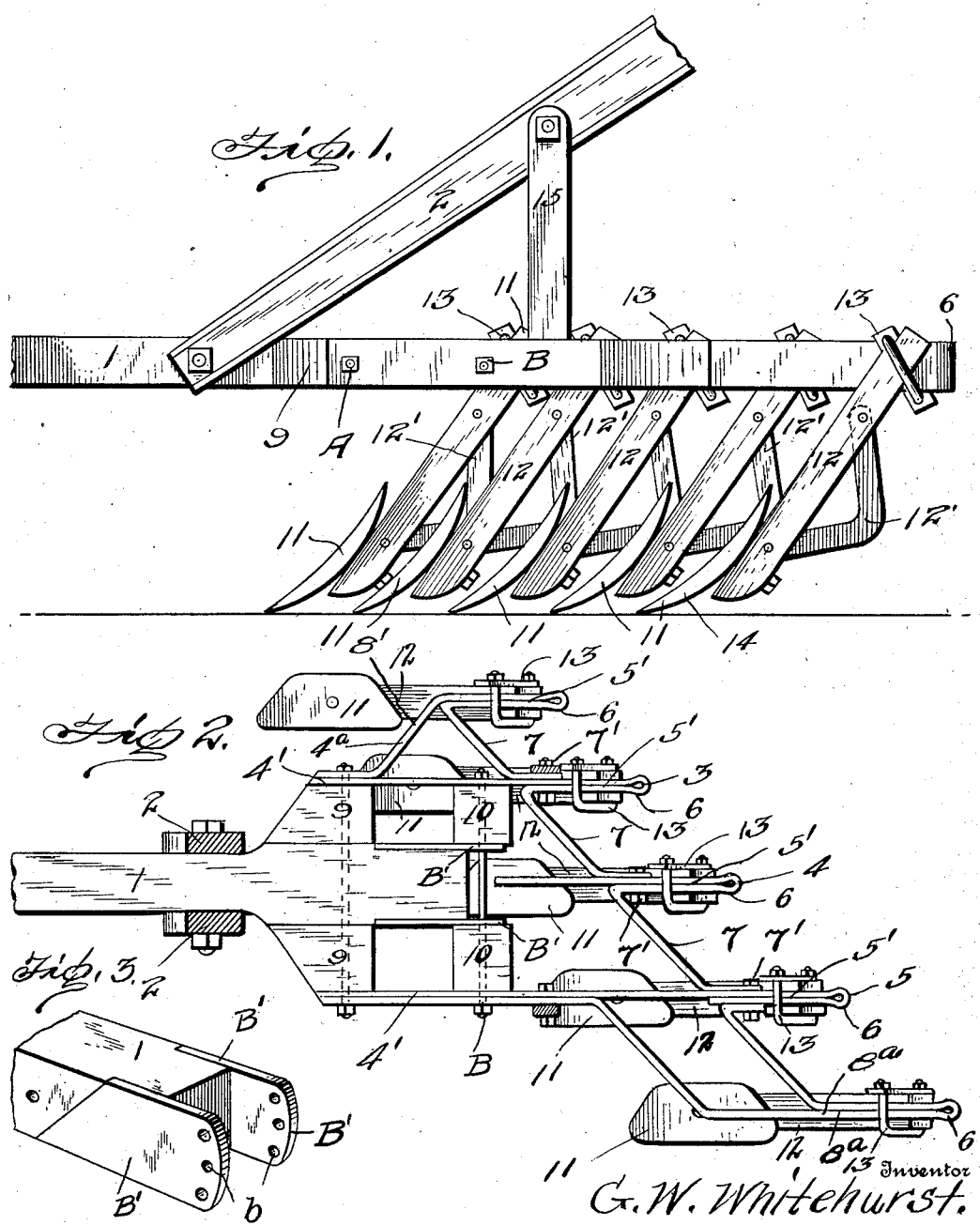

No. 727,519. Patented May 5, 1903.

UNITED STATES PATENT OFFICE.

GEORGE W. WHITEHURST, OF ELLISVILLE, MISSISSIPPI.

CULTIVATOR.

SPECIFICATION forming part of Letters Patent No. 727,519, dated May 5, 1903.

Application filed January 9, 1903. Serial No. 138,402. (No model.)

*To all whom it may concern:*

Be it known that I, GEORGE W. WHITEHURST, a citizen of the United States, residing at Ellisville, in the county of Jones and State of Mississippi, have invented certain new and useful Improvements in Cultivators; and I do declare the following to be a full, clear, and exact description of the invention, such as will enable others skilled in the art to which it appertains to make and use the same.

This invention relates to cultivators of that kind in which the shovels are arranged transversely across the frame, one in advance of the other, and may be adjusted at any desired angle to the line of draft.

The object of the invention is to provide a cultivator of this character in which the shovels are supported by brackets of novel construction and arrangement, whereby maximum strength and extreme lightness of the cultivator are secured.

With this and other objects in view, which will appear as the nature of the invention is better understood, the invention consists of certain novel features of construction and combination and arrangement of parts, as will be hereinafter more fully described, and particularly pointed out in the appended claims.

In the accompanying drawings, Figure 1 is a side elevation of my improved cultivator, the upper ends of the handles of which are broken away. Fig. 2 is a top plan view of the same. Fig. 3 is a fragmentary perspective view of the rear end of the beam.

Referring now more particularly to the drawings, 1 represents the cultivator-beam, and 2 the handles.

3, 4, and 5 denote brackets, each of which consists of a longitudinal bar, having one end forming an attaching-arm 4', which is fixed to the cultivator beam or frame. The intermediate portion of the bar is doubled upon itself, as shown at 5, and bent to form a laterally-offstanding bearing-shoulder 6, and the opposite end of the bar extends at an angle to said folded portion to form a brace 7. The brackets 3, 4, and 5, which may be termed "main supporting-brackets," have their attaching-arms 4' bolted to the beam 1 and to the spacing-blocks 9 and 10 on opposite sides thereof and are of different lengths, so that the doubled supporting portions of the several brackets project in regular order or succession a greater distance from the rear of the frame from one side thereof to the opposite side, so that the shovels 11, carried by the standards 12, will be arranged transversely of the frame and at a diagonal angle to the line of draft. The standards 12 are secured by clips 13 to the doubled supporting portions of the brackets and may be adjusted along the same to arrange the shovels at different angles to the line of draft. Normally, however, the standards 12 are so arranged that they and the clips 13 are limited in rearward movement by the shoulders 6, which act as bearing or reinforcing braces therefor to assist in sustaining a portion of the strain falling thereon. By reference to Fig. 2 it will be seen that the brace 7 of each bracket extends across to and is united by a bolt 7' to the doubled portion of an adjacent bracket and that these braces are disposed in longitudinal alinement, thus reinforcing the several brackets throughout the series in the most effective manner.

The shovels 11 may be of any desired form and construction, and the standards 12 may also be of any desired form and construction and are preferably reinforced by angular braces 12'. The upper end of each standard preferably straddles the doubled portion of the coacting bracket and is united thereto by the diagonally-disposed clips 13, although any other suitable form of fastening means may be employed.

If desired, supplemental brackets 8' and 8ª may be added and secured at the sides of the frame to increase the number of shovels. These brackets differ from the main brackets 3, 4, and 5 in that the arms 4' and 7 thereof are both bent at an angle to the doubled portion and diverge and are connected to the frame and side main brackets 3 and 5.

Transverse bolts A and B secure the parts together. As shown, the front bolt A also passes through the tongue, while the rear bolt B passes through the projecting ends of plates B', secured to opposite sides of the rear end of the tongue. These plates B' are provided each with a series of openings *b*, through either one of which the bolt B may be passed, thus enabling the tongue to be adjusted on bolt A as a pivot to suit different heights of draft and to be held in adjusted position by said plates B' and bolts B.

From the foregoing description, taken in connection with the accompanying drawings, the construction and mode of operation of the invention may be readily understood, and it will be seen that a construction and arrangement of supporting-brackets is provided whereby a structure of extreme strength and lightness is secured and the shovels supported in the most effective manner to transmit the strain so as to be taken up by the several reinforced braces.

I do not limit the braces to application to a cultivator, as I may employ the same upon other agricultural implements; but I reserve the right to make such other changes and modification in the construction and arrangement of the several parts as fairly fall within the spirit and scope of my invention.

Having thus fully described my invention, what I claim as new, and desire to secure by Letters Patent of the United States, is—

1. In an agricultural implement, a supporting-bracket comprising a bar doubled upon itself to form a strengthened supporting portion and having its ends forming arms for respective attachments to a frame and adjacent bracket, substantially as described.

2. In an agricultural implement, a supporting-bracket comprising a bar doubled upon itself and having its doubled portion bent to provide a strengthened supporting portion and a bearing-shoulder for the standard, and having its ends forming arms for respective attachments to a frame and adjacent bracket, substantially as described.

3. In an agricultural implement, a supporting-bracket comprising a bar having one end forming an attaching-arm and its opposite end bent at an angle thereto to form a brace for an adjacent bracket, the intermediate portion of the bar being doubled upon itself to form a strengthened supporting portion, substantially as described.

4. In a plow or cultivator, the combination with a frame, of supporting-brackets each consisting of a longitudinal bar doubled upon itself to form a supporting portion and having one end fixed to the frame and the opposite end bent at an angle to said supporting portion and forming a brace connected to the frame or supporting portion of an adjacent bracket, and standards secured to the supporting portions of the brackets, substantially as described.

In testimony whereof I have hereunto set my hand in presence of two subscribing witnesses.

GEORGE W. WHITEHURST.

Witnesses:
LUTHER HILL,
W. J. RACK.